United States Patent [19]

Ghisolfi et al.

[11] Patent Number: 5,612,011
[45] Date of Patent: *Mar. 18, 1997

[54] PROCESS FOR THE PURIFICATION OF INERT GASES

[75] Inventors: Guido Ghisolfi; Dario Giordano; Giuseppina Boveri, all of Tortona; Hussain A. K. Al Ghatta, Fiuggi, all of Italy

[73] Assignee: Sinco Engineering S.p.A., Tortona, Italy

[ * ] Notice: The term of this patent shall not extend beyond the expiration date of Pat. No. 5,547,652.

[21] Appl. No.: 559,553

[22] Filed: Nov. 16, 1995

Related U.S. Application Data

[63] Continuation-in-part of Ser. No. 397,209, filed as PCT/EP93/03117, Nov. 8, 1993 publsihed as WO95/02446, Jan. 26, 1995, Pat. No. 5,547,652.

[30] Foreign Application Priority Data

Jul. 16, 1993 [IT] Italy .................... MI93A1576
Jan. 20, 1995 [IT] Italy .................... MI95A0085

[51] Int. Cl.⁶ ........................................ B01J 8/00
[52] U.S. Cl. .................... 423/245.3; 423/351; 528/272; 528/274
[58] Field of Search ............... 423/245.3, 351; 528/272, 274

[56] References Cited

U.S. PATENT DOCUMENTS 2,756,121 7/1956 Grimes .
4,919,903 4/1990 Gandhi et al. .

FOREIGN PATENT DOCUMENTS 0197717    10/1986  European Pat. Off. .
0197717A1  10/1986  European Pat. Off. .
0222714    5/1987   European Pat. Off. .
0222714A2  5/1987   European Pat. Off. .
3424532C1  1/1986   Germany .
3424532    1/1986   Germany .
3527175A1  2/1987   Germany .
3527175    2/1987   Germany .
3628572    3/1988   Germany .
3628572A1  3/1988   Germany .
53-60369   5/1978   Japan .
57-130534  8/1982   Japan .
60-187323  9/1985   Japan .
1-262311   10/1989  Japan .
4-363138   12/1992  Japan .
592436     2/1978   U.S.S.R. .
WO95/02446 1/1995   WIPO .

OTHER PUBLICATIONS

Derwent Abstract week 8711; Class E36, AN 87–073107 & DD–A–240 672 (Veb Leuna–Werk Ulbricht.

Abstract: Database WPI, Section Ch, Week 8711, Derwent Publications, Inc. (London, GB), AN 87–073107 & DD,A, 240 672 (Veb Leuna–Werk Ulbricht).

Primary Examiner—Wayne Langel
Attorney, Agent, or Firm—Edward D. Manzo; Mark J. Murphy; Ted K. Ringsred

[57] ABSTRACT

Process for the purification of an inert gas recycled from a solid state polycondensation (SSP) reactor of aromatic polyester resins, comprising the step of adding the gas with oxygen or gas containing oxygen in stoichiometric quantity or in such an excess that the gas at the outlet of the catalytic bed contains no more than 250 ppm of oxygen, circulating the gas on a catalytic bed comprising Pt or Pt and Pd heated at temperatures from 250° to 600° C. and recycling the gas to SSP reactor with previous drying to eliminate the water formed in the oxidation stage.

15 Claims, No Drawings

PROCESS FOR THE PURIFICATION OF INERT GASES

This is a continuation-in-part of application Ser. No. 08/397,209 filed on Mar. 10, 1995, now U.S. Pat. No. 5,547,652 issued Aug. 20, 1996, which is a national stage of PCT application PCT/EP93/03117 filed on Nov. 8, 1993 published as WO95/02446, Jan. 26, 1995.

The present invention refers to a process for the purification of an inert gas containing impurities formed of organic compounds.

The invention relates particularly to a process for the purification of a washing inert gas recycled from the solid state polycondensation (SSP) reactors of aromatic polyester resins.

The impurities present in the inert gas streams (nitrogen) used as washing gas in the SSP reactors are generally formed of aldehydes and glycols (acetaldehyde and ethilenglycol in the case of polyethyleneterephthalate) and glycol oligomers.

These impurities are stripped from polymer chips and accumulate in the inert gas stream. They are present in the gas to be purified, in quantities, defined as methane equivalent, of up to about 2000–3000 ppm or more. The method so far used for the purification of inert gases recycled from a SSP reactor includes:

$CO_2$ oxidation stage of the impurities;

a deoxidation stage with hydrogen in order to eliminate the oxygen used in the first stage;

a drying-process stage of the gaseous stream in order to eliminate the water formed in the previous stages.

The oxidation stage is carried out with oxygen or with gas containing oxygen (generally air) by using an oxygen in excess of the stoichiometric quantity as regards the impurities. The oxidation stage performance is controlled so that the gaseous stream at the outlet contains an oxygen in excess of 50–500 ppm.

The reaction is generally carried out at a temperature between 500° C. and 600° C. by circulating the gaseous stream on a catalyst bed formed of a support coated with platinum or platinum/palladium.

The high oxygen content present in the gaseous stream coming out of the oxidation section does not allow for recycling the same to the SSP reactor, with the previous drying-process, due to possible oxidation reactions and/or polymer degradation.

A deoxidation treatment with hydrogen in order to eliminate the presence of oxygen. The performance of the deoxidation section is monitored by controlling the excess of hydrogen present in the stream at the outlet and the oxygen content.

The last stage is a drying-treatment carried out by circulating the gas on a silica gel, molecular sieves or other beds of drying materials. In this stage the water stripped from polymer chips and generated in the oxidation and deoxidation stages, is eliminated.

After this stage, the gas is recycled to the SSP reactor.

SUMMARY OF THE INVENTION

It has been unexpectedly found, that it is possible to purify with satisfactory results the stream of an inert gas recycled from a SSP reactor of polyester resins. This is done by using the stoichiometric quantity of oxygen necessary for the oxidation (combustion) of the impurities or a quantity slightly higher than the stoichiometric one, but not having oxygen concentrations higher than 250 ppm in the gas coming out of the reactor.

The thus purified gas is directly recycled to the SSP reactor, with the previous drying-treatment, omitting in this way the deoxidation stage with hydrogen.

Preferably the oxygen content in the recycled gas is kept below 10 ppm.

The oxygen traces when present in the recycled gas do not cause oxidation effects and/or polymer degradation such as yellowing.

Even when the oxygen quantity is the stoichiometric one or a little higher, it is possible to reduce the impurities to acceptable values, such as less than 10 ppm (defined as methane equivalent).

DETAILED DESCRIPTION OF THE PRESENTLY PREFERRED EMBODIMENTS

To realize the purification process of the present invention in a continuous process, continuous control of the stoichiometry of the oxidation reaction is necessary. Accordingly, it is necessary to monitor the oxygen quantity present in the gaseous stream at the outlet of the oxidation reactor with devices able to detect ppm of oxygen (10 ppm or less) with very short response times (less than few minutes), sampling included.

It has been found, and this is another aspect of the invention, that the zirconia sensors for oxygen are analyzers suitable for working the invention process.

These sensors include a ceramic material made of zirconia doped with yttrium that, when heated at a temperature higher than 620° C., is converted into an electrolytic conductor for the oxygen ions and it is capable of functioning as an oxygen concentration cell.

The sensor is generally formed of a probe with a porous platinum coating on the internal and external surface. Air or a gas with a known oxygen concentration, which is used as a reference gas, circulates outside the tube; on the inside the gas sample to be analyzed is circulated.

A current of oxygen ions tends to migrate from the sensor external surface to the internal one; in an equilibrium condition a potential difference among the Pt electrodes is settled, which depends on the different oxygen concentration in the gases inside and outside the sensor.

These sensors allow response times even lower than 5 sec. Zirconia analyzers are known in the literature and are available commercially. Producers of zirconia sensors are Panametrics, Rosemounts, Hartman & Brown Westinghouse, Systech. In addition to the above-mentioned sensors, it is possible to use any other oxygen sensor, even if it operates with different principles, provided that it is able to detect oxygen quantities at ppm level with an analysis time of less than 5 sec.

The oxidation temperature is comprised between 250° C. and 600° C. and depends mainly on the type of catalyst used.

The catalyst preferably consists of platinum or platinum-palladium placed on an inert support.

Examples of utilizable supports are gamma alumina and silica.

It has been found, and this is another aspect of the invention, that the temperature can be lowered between 250° C. and 350° C. in comparison with 500° C.-600° C. necessary in the processes of the prior art, using Pt-Pd catalyst supported on a special type of gamma alumina having a surface area higher than 70–80 $m^2/g$, a bulk density of 0.6–0.7 $g/cm^3$, a porosity of 0.5–0.6 $cm^3/g$, and particles size of 2–4 mm. The Pt and Pd content is respectively of about 1,5% by weight.

Catalysts containing only Pt (1–2% by weight) supported on gamma alumina can be also used.

The Pt or Pt-Pd oxidation catalysts usable in the invention process are of a known type.

Catalysts sold with the trade-mark F 257 Id/D-IPAD 115/100 DA1; E 257 Id/d-IPAD 215/100 DB1; EF 2038 Id/D-IPAD 115/215 100 D/H by DEGUSSA and with trade-mark K 0144 - IPAD 11/60 Il/A and KO 240 - IPAD 25/60 Id/B by HERAEUS can be found on the market.

A detailed description of a preferred method of carrying out the process is as follows:

The gas (generally nitrogen) recycled from the SSP reactor is at a temperature between 200° and 240° C.

At first it is filtered and air is injected in such a quantity to guarantee the complete combustion of the present impurities, tolerating a max. excess preferably lower than about 10 ppm of oxygen at the reactor outlet.

The air/nitrogen mixture is heated to a temperature of 250° C. and sent to the oxidation reactor, where the impurities combustion is obtained by circulating the stream on a catalyst bed including Pt or Pt-Pd.

The gaseous stream is circulated through a heat exchanger for the heat recovery and then it is sent to the second stage operating at 200° C.

The gaseous stream at the reactor outlet contains only nitrogen, carbon dioxide, water and traces of oxygen (less than about 250 ppm).

The carbon dioxide content stabilizes at a certain level due to the losses through the SSP plant and acts like an inert gas, due to its chemical inertia.

The water is eliminated by cooling at first the gaseous stream at about 10°–15° C. with a double-effect heat exchanger.

A part of the stream condenses and is eliminated; the stream then goes into a molecular sieves dryer from where it is recycled to the SSP reactor, after having been filtered from the possible particles deriving from the molecular sieves.

The regeneration of the molecular sieves bed is performed according to known methods, operating for example on a closed circuit with a hot nitrogen stream.

The polyester resins usable in the SSP process are products of polycondensation of aromatic bicarboxylic acid, particularly terephthalic acid or its esters with diols with 1–12 carbon atoms such as ethylene glycol, 1,4-dimethylolcyclohexane, 1,4-butandiol. The polyethyleneterephthalate and the polybutilenetere phthalate are the preferred resins. The elastomeric polyester resins, including segments deriving from polyethylene glycol, are included in the definition of polyester resins.

The copolyesters containing units up to 20%, deriving from aromatic bicarboxylic acids different from terephthalic acid, such as isophthalic acid, are also included.

The resins to be subjected to SSP can contain a resin upgrading additive, i.e. able to accelerate the sol id state polycondensation reaction. The preferred upgrading compounds are the dianhydrides of tetracarboxylic aromatic acids.

Pyromellitic dianhydride is the preferred compound.

The upgrading agent is generally used in a quantity of about 0.05–2% by weight.

Conventional additives, like stabilizers, dyes, flame retardant, nucleants can be present in the resin.

The invention process can be applied not only to the inert gas purification coming from a SSP reactor, but also to the inert gas purification containing impurities of any type of organic nature, provided that they are oxidable to $CO_2$ and water under the process conditions.

The following example is given to illustrate and not to limit the invention.

EXAMPLE 1

Table 1 shows the composition of the different circulating streams in a plant for the purification of nitrogen coming from a reactor for solid state polycondensation of polyethyleneterephthalate, having a capacity of 68 t/d.

Numeral 1 designates the nitrogen stream to be purified, numeral 2 the stream after the oxidation stage, numeral 3 the air stream injected into the nitrogen stream, numeral 4 the purificated gas stream.

The oxygen quantity used in the oxidation stage is such as to have less than 5 ppm of oxygen in the gaseous stream at the outlet of the reactor.

The mixture air/nitrogen is heated to a temperature of about 300° before being sent to the oxidation reactor, where it is circulated on a bed of catalyst particles formed of Pt (1,5% by weight) and Pd (1,5% by weight) supported on gamma alumina having a surface area of 100 $m^2/g$ and a porosity of 0.54 $cm^3/g$. (Catalyst EF 2038 Id/IPAD 115/215 100 PH produced by HERAEUS).

No yellowing of the polymer was noted nor variation of the I.V. value which remained in the range of 0.792–0.80 dl/g.

TABLE 1

| Components | Gaseous Stream | | | |
|---|---|---|---|---|
| | 1 | 2 | 3 | 4 |
| Water Kg/h | 9.5 | 4.66 | | <5 ppm |
| nitrogen Kg/h | 2430 | 2443 | 13.4 | 2443 |
| acetaldehyde Kg/h | 0.3 | | | |
| ethylene glycol Kg/h | 2.1 | | | |
| total hydrocarbons Kg/h | 2.5 | <10 ppm | | <10 ppm |
| oxygen Kg/h | traces | <5 ppm | 3.6 | <5 ppm |
| $CO_2$ Kg/h | 65 | 68.7 | | 68.7 |

What is claimed is:

1. Process for the purification, from impurities formed of organic compounds, of a recycle inert gas stream leaving a solid-state polycondensation reactor of aromatic polyester resins, comprising the steps of:

adding oxygen or gas containing oxygen to the gas stream;

circulating said gas stream on a catalytic bed containing Pt or mixtures of Pt and Pd supported on an inert porous support at temperatures from 250° to 600° C. in an oxidation reactor having an outlet wherein the quantity of oxygen used is in such an excess that the gas at the outlet of the oxidation reactor contains greater than 10 ppm but less than or equal to 250 ppm of oxygen;

drying the gaseous stream leaving the oxidation reactor to remove water from the stream; and recycling the stream to the solid-state polycondensation reactor.

2. Process for the purification of a gas according to claim 1, wherein the quantity of oxygen of the oxidation reaction is monitored by connecting, at the outlet of the catalytic bed, an oxygen analyser suitable to detect oxygen ppm with analysis response times less than 5 sec.

3. Process according to claim 2 wherein the inert gas is nitrogen or includes nitrogen.

4. Process according to claim 2, wherein the catalyst is formed of Pt and Pd supported on gamma alumina having a porosity of 0.5–0.6 cm$^2$/g.

5. Process according to claim 4, wherein the temperature of catalytic bed is kept between 250° and 350° C.

6. Process according to claim 2, wherein the analyser is a zirconia sensor for oxygen.

7. Process according to claim 2, wherein said gas containing oxygen is air.

8. Process according to claim 1 wherein the inert gas is nitrogen or includes nitrogen.

9. Process according to claim 1 wherein the catalyst is formed of Pt and Pd supported on gamma alumina having a porosity of 0.5–0.6 cm$^2$/g.

10. Process according to claim 3 wherein the catalyst is formed of Pt and Pd supported on gamma alumina having a porosity of 0.4–0.6 cm$^2$/g.

11. Process according to claim 8 wherein the catalyst is formed of Pt and Pd supported on gamma alumina having a porosity of 0.4–0.6 cm$^2$/g.

12. Process according to claim 1, wherein said gas containing oxygen is air.

13. Process according to claim 3, wherein said gas containing oxygen is air.

14. Process according to claim 4, wherein said gas containing oxygen is air.

15. Process according to claim 6, wherein said gas containing oxygen is air.

* * * * *

UNITED STATES PATENT AND TRADEMARK OFFICE
CERTIFICATE OF CORRECTION

PATENT NO. : 5,612,011
DATED : March 18, 1997
INVENTOR(S) : Guido GHISOLFI et al.

It is certified that error appears in the above-identified patent and that said Letters Patent is hereby corrected as shown below:

Col. 1, before line 9, insert --Background of the Invention.--

Col. 1, line 46, after "treatment", insert --is necessary--.

Signed and Sealed this

Fourth Day of November, 1997

Attest:

BRUCE LEHMAN

Attesting Officer

Commissioner of Patents and Trademarks